Figures 1, 2:
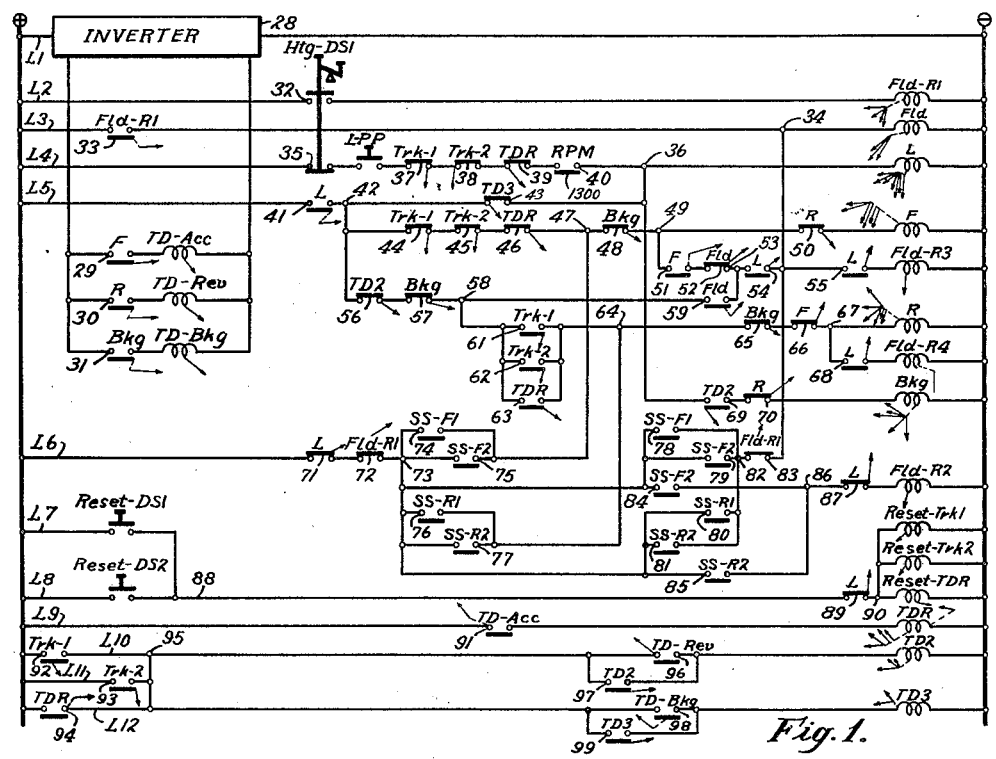

May 16, 1950      M. F. JONES      2,508,168
ELECTRICALLY CONTROLLED POLYPHASE MOTOR SYSTEM
Filed March 27, 1947

INVENTOR
Maurice F. Jones.
BY O. B. Buchanan
ATTORNEY

Patented May 16, 1950

2,508,168

UNITED STATES PATENT OFFICE 2,508,168

ELECTRICALLY CONTROLLED POLYPHASE MOTOR SYSTEM

Maurice F. Jones, Pittsburgh, Pa., assignor to Westinghouse Electric Corporation, East Pittsburgh, Pa., a corporation of Pennsylvania Application March 27, 1947, Serial No. 737,647

18 Claims. (Cl. 318—135)

My invention relates to motor-control systems and power-plants therefor, and it has particular relation to the control of polyphase linear motors for use as catapults for launching aircraft. My invention is an improvement over the catapult-system which is described and claimed in a patent of Frank B. Powers, 2,404,984, granted July 30, 1946, and other patents and applications assigned to the Westinghouse Electric Corporation.

An object of my invention is to provide improved means for causing the voltage to be gradually applied, when the polyphase motor is first excited.

A more specifically stated object of my invention is to provide a polyphase generator having a field-winding circuit which is normally unexcited, and also having a normally open polyphase switching-means for connecting said generator to the polyphase motor, in combination with control-means for closing the field-switch when or after the polyphase switching-means is closed.

A further object of my invention is to provide direct-current braking-means for bringing the polyphase motor to a stop by applying direct current across a plurality of the motor-terminals, either with, or without, the use of reverse-phase-sequence plugging for first partially reducing the motor-speed.

A further object of my invention is to provide a special power-plant control-system utilizing a flywheel motor-generator set for supplying the intermittent load required by the polyphase motor, and including the use of the motor-terminals of this motor-generator set for supplying both the field-current for the polyphase generator and the braking-current for stopping the polyphase motor.

With the foregoing and other objects in view, my invention consists in the circuits, combinations, apparatus, systems, parts and operations hereinafter described and claimed, and illustrated in the accompanying drawing, wherein Figures 1 and 2 are simplified schematic views of the direct-current and alternating-current circuits, respectively, of apparatus, illustrative of my invention.

As shown in Fig. 2, my invention is utilized for the energization of a three-phase motor M, of a polyphase-motored movable body which is diagrammatically indicated, in the drawing, by means of current-collector shoes 21, which connect the motor-terminals to a track TRK and third-rail buses B2 and B3, respectively. A third, feeder-bus B1 is utilized, for supplying power into the track TRK at a plurality of spaced intervals along the track, as indicated by feeder-connections 24, which are provided with current-transformers CT—8, CT—10, etc., at different numbered points along the trackway.

An intermittently rated three-phase generator, marked AC—GEN, and having terminals T1, T2 and T3, is utilized to energize the motor-supplying buses B1, B2 and B3, through the main contacts 22 and 23 of "forward" and "reverse" phase-sequence polyphase switching-means F and R, respectively. The polyphase generator is a part of a flywheel motor-generator set comprising a direct-current motor DC—MOT, a flywheel FW, and the polyphase generator AC—GEN. The direct-current motor DC—MOT is continuously connected to a direct-current generator DC—GEN, which is driven by a prime mover PM of preferably constant speed.

The direct-current motor and the direct-current generator are each provided with a field-winding 25 and 26, respectively, the regulating means for which have been omitted, for clarity of illustration, the particular regulating means which I prefer to utilize being the subject-matter of an application of E. C. Whitney, Serial No. 730,322, filed February 24, 1947, now Patent No. 2,484,260, issued October 11, 1949, assigned to the Westinghouse Electric Corporation. The control is such that a substantially constant voltage is maintained on the direct-current generator-terminals G+ and G—, and so that the flywheel-set is slowly brought up again to normal speed, by the direct-current motor DC—MOT, at the end of each intermittent load-period on the polyphase generator AC—GEN. The direct-current motor and the direct-current generator are each supplied with just enough series field 27 to stabilize the machine.

The control is shown by schematic, or "across the line," diagram, between positive and negative buses marked (+) and (—). Each relay or electrically operated switching-device is indicated by a separate letter-designation or legend, which is applied to the actuating coil and to all of the contacts of the relay, as a convention for symbolically tying the various relay-parts together. All parts are shown in the deenergized position. Arrows or dotted lines are also used, to symbolically indicate how the various parts of each relay are connected together.

The first line L1 of the schematic diagram shows an inverter 28 which supplies alternating-current, of a suitable frequency, to three timers marked TD—Acc, TD—Rev and TD—Bkg, for respectively controlling, or providing backup protection for, the acceleration, the reverse-power operation, and the direct-current braking, of the linear motor M, as will be subsequently apparent. These three timers are respectively set in operation by suitable switching-means which initiate the various operations which are being timed, namely a make-contact 29 of the "forward" relay F, a make-contact 30 of the "reverse" relay R, and a make-contact 31 of the "braking" relay Bkg.

The second line L2 of the schematic diagram shows a normally open contact 32 of a double-position, double-pole pushbutton Htg—DS1 for energizing the operating-coil of a first field-resistance relay Fld—R1, which will be subsequently described. The pushbutton-designation Htg designates that the pushbutton is utilized for track-heating, as will be subsequently described. The suffix-designation DS1 indicates that the part in question is located on a No. 1 deck-stand, or a control-stand, or desk or switchboard, which is mounted on deck, or on or above the launching-field. In general, there will be two or more auxiliary, above-ground, control-stands, which are symbolically indicated by the markings DS1 and DS2, respectively, and there will be a main control-stand in the power-plant, designated PP, containing the prime-mover and the flywheel-set, the power-plant being commonly located underground.

The third line L3 of the schematic diagram shows that the first field-resistance relay Fld—R1 has a make-contact 33 which energizes a circuit 34 for energizing the operating-coil of a field-switch Fld which will be subsequently described.

The fourth line L4 of the schematic diagram shows a normally closed contact 35 of the track-heating pushbutton Htg—DS1, in series with a number of other contacts for energizing a circuit 36 which energizes the actuating coil of a launching-relay L, which serves as an automatic relay for maintaining a whole series of operations and carrying them through to a predetermined conclusion, as will be subsequently pointed out. The other contacts, which are connected in series with the normally closed heating-pushbutton contact 35, include a launching pushbutton L—PP which is preferably (though not necessarily) located on the main control-stand, in the power-plant, also back-contacts 37, 38 and 39 of two track-relays Trk—1 and Trk—2, and a time-delay relay TDR, all of which will be subsequently described. In the particular form of embodiment which is illustrated, the additional contacts which are connected in series with the heating-pushbutton contact 35 also include the contact 40 of a speed-switch RPM, which is not otherwise shown on the diagram, but which responds to the desired rated speed of the flywheel-set, this contact being closed at 1300 R. P. M., or other desired flywheel-speed. This makes sure that there is sufficient kinetic energy stored in the flywheel-set before a launching can be initiated.

The fifth line L5 of the schematic diagram shows that the launching-relay L has a make-contact 41 which energizes a circuit 42. The circuit 42 has three branches, the first branch including the back-contact 43 of a No. 3 auxiliary time-delay relay TD3, which in turn energizes the circuit-conductor 36, thus affording a holding-circuit for the launching-relay L. The second branch of the circuit 42 includes three serially connected back-contacts 44, 45 and 46 of the two track-relays Trk—1 and Trk—2 and the auxiliary time-delay relay TDR, respectively, these contacts energizing a circuit 47, which continue on, through a back-contact 48 of the braking-relay Bkg, to a conductor 49.

The conductor 49 energizes the operating-coil F of the forward-phase-sequence polyphase relay or contactor or switching-means, which is utilized to connect the generator-buses T1, T2 and T3 to the motor-buses B1, B2 and B3, in a desired forward phase-sequence, as previously described. The energizing-circuit for the forward-relay operating-coil F includes a back-contact 50 of the reverse-relay R, to make sure that the forward and reverse relays or contactors F and R cannot both be closed at the same time.

The conductor 49 is also utilized to energize a branch-circuit which contains a make-contact 51 of the forward-relay F, and a back-contact 52 of the field-relay Fld, to energize a conductor 53, which continues on, through a make-contact 54 of the launching-relay L, to the conductor 34 which energizes the actuating coil of the field-relay Fld. At the same time, the conductor 34 branches off, through a make-contact 55 of the launching-relay L, to energize a No. 3 field-resistance relay Fld—R3.

The third branch-circuit of the conductor 42 is utilized to energize two serially connected back-contacts 56 and 57 of the No. 2 time-delay relay TD2 and the braking-relay Bkg, respectively, these contacts serving to energize a conductor 58, which continues on, through a make-contact 59 of the field-relay Fld, to energize the conductor 53, thus providing a holding-circuit for the field-relay Fld, it being understood that the field-relay make-contact 59 closes before the field-relay back-contact 52 opens.

It will be noted, from the connections thus far described, that the launching-relay L, or operation-maintaining relay, seals itself in, at 43, until the No. 3 time-delay relay TD3 operates, whereas the "forward" contactor F remains energized only until there is a response of one of the two track-relays Trk—1 or Trk—2, or of the time-delay backup-protector relay TDR. The field-relay Fld, on the contrary, together with the No. 3 field-resistance relay Fld—R3, are sealed in, at 56 until the operation of the No. 2 time-delay relay TD2, which operates prior to the No. 3 time-delay relay TD3, as will be subsequently explained.

The conductor 58 has a branch-circuit which is energized by three parallel-connected make-contacts 61, 62, and 63 of the two track-relays Trk—1 and Trk—2 and the time-relay TDR, respectively. These three contacts energize a conductor 64, which continues on, through two serially connected back-contacts 65 and 66 of the braking-relay Bkg and the forward-contactor F, respectively, to energize a conductor 67 which energizes the actuating-coil R of the reverse-phase-sequence polyphase contactor R. At the same time, a branch-circuit of the conductor 67 continues on, through a make-contact 68 of the launching-relay L, to energize the actuating-coil of a No. 4 field-resistance relay Fld—R4.

It will be noted that the reverse-relay R remains energized only until the response of the No. 2 time-delay relay TD2, which breaks the reverse-relay energizing-circuit at 56, and at the same time breaks the holding-circuit 56—57—58—59—53—54—34 of the field-relay Fld.

The conductor 36 is provided with a branch-circuit containing a make-contact 69 of the No. 2 time-delay relay TD2, and a serially connected back-contact 70 of the reverse-contactor R, to energize the actuating-winding of the braking-relay Bkg.

The sixth line L6 of the schematic diagram shows a back-contact 71 of the launching-relay L, in series with a back-contact 72 of the No. 1 field-resistance relay Fld—R1, to energize a circuit 73 which is utilized to energize a spotting-switch SS, which is more particularly described and claimed in an application of Ruel C. Jones, Serial No. 537,515, filed May 26, 1944, and assigned to the Westinghouse Electric Corporation. The spotting-switch SS performs the same function as the slow-return positions of the controller-switch 34 of the Powers patent, except that the spotting-switch contacts are placed in a switch-mechanism which is separate from the take-off or launching button L—PP. In accordance with my present invention, the spotting-switch SS is rendered inoperative whenever the launching-relay L is energized, or whenever the field-resistance relay Fld—R1 of the track-heating operation is energized.

The spotting-switch SS has two forward-positions, designated by the suffixes F1 and F2, and two reverse-positions, designated by the suffixes R1 and R2, there being several switch-contacts in each of these four positions.

From the conductor 73, there are four branch-circuits. A first branch-circuit includes two parallel-connected make-contacts 74 and 75 of the two forward positions SS—F1, SS—F2 of the spotting switch, and these two contacts 74 and 75 are utilized to energize the circuit 47 which energizes the forward-contactor F. A second branch-circuit of the conductor 73 includes two parallel-connected make-contacts 76 and 77 which are closed in the two reverse-positions SS—R1 and SS—R2 of the spotting-switch SS, and these two contacts 76 and 77 are utilized to energize the conductor 64 which energizes the reverse-contactor R. A third branch-circuit of the conductor 73 includes four parallel-connected make-contacts 78, 79, 80 and 81, which are closed in all four positions SS—F1, SS—F2, SS—R1, and SS—R2 of the spotting-switch SS, and these four contacts are utilized to energize a conductor 82, which continues on, through a back-contact 83 of the No. 1 field-resistance relay Fld—R1, to energize the conductor 34 which actuates the field-switch Fld. A fourth branch-circuit of the conductor 73 includes two parallel-connected make-contacts 84 and 85, which are energized in the No. 2 forward and reverse positions SS—F2 and SS—R2 of the spotting-switch SS, and these two contacts 84 and 85 are utilized to energize a circuit 86, which continues on, through a back-contact 87 of the launching-relay L, to energize the actuating-coil of the No. 2 field-resistance relay Fld—R2.

The seventh and eighth lines L7 and L8 of the schematic diagram show two parallel-connected "reset" pushbuttons Reset—DS1 and Reset—DS2, which are utilized to energize a circuit 88, which continues on, through a back-contact 89 of the launching-relay L, to energize a circuit 90 which in turn energizes the reset-coils of the two track-relays Trk—1 and Trk—2 and the No. 1 time-delay relay TDR, as indicated by the legends Reset—Trk—1, Reset—Trk—2, and Reset—TDR. The three relays just mentioned, namely the two track-relays Trk—1 and Trk—2, and the No. 1 time-delay relay R, are all relays of the retained-position type. They are moved to their actuated positions, whenever their respective actuating-coils Trk—1, Trk—2 and TDR are momentarily energized, and thereafter remain in their actuated positions until they are returned to their non-actuated positions by a momentary energization of their respective reset-coils.

The ninth line L9 of the schematic diagram shows that the backup-protection acceleration-timing timer TD—Acc has a make-contact 91 which is utilized to energize the actuating-coil TDR of the No. 1 time-delay relay.

The last three lines L10, L11 and L12 of the schematic diagram show three parallel-connected make-contacts 92, 93 and 94 of the two track-relays Trk—1 and Trk—2, and the No. 1 time-delay relay TDR, which are utilized to energize a circuit 95, which has two branches. One branch of the circuit 95 continues on, through two parallel-connected contacts 96 and 97, of the reverse-power timer TD—Rev and the No 2 time-delay relay TD2, to energize the actuating-coil TD2 of the No. 2 time-delay relay. The second branch of the circuit 95 continues on, through two parallel-connected make-contacts 98 and 99 of the braking-timer TD—Bkg and the No. 3 time-delay relay TD3, to energize the actuating coil TD3 of the No. 3 time-delay relay TD3.

In addition to the direct-current circuits which are energized from the buses (+) and (—), there are some additional direct-current circuits which are energized from the terminals G+ and G— of the direct-current generator DC—GEN. It will be understood that the direct-current generator has a permanent connection 101 which energizes the motor DC—MOT of the motor-generator flywheel-set.

In addition, the direct-current generator DC—GEN has a branch-circuit 102 which is connected, from G+, through a make-contact 103 of the field-switch Fld, to the field-winding 104 of the polyphase generator AC—GEN, and thence, through a field-resistance 105, to the negative terminal G— of the direct-current generator. Successive portions of the field-resistance 105 are shunted, respectively, by the make-contacts 111, 112, 113 and 114 of the four field-resistance relays Fld—R1 through Fld—R4. The field-winding 104 of the polyphase generator AC—GEN is shunted by a field-discharge resistance 115.

The direct-current generator DC—GEN has a motor-braking circuit 116, which continues, from the terminal G+, through the make-contact 117 of the braking-relay Bkg, to the bus B1 of the polyphase motor M. This braking-circuit continues, from the motor-bus B3, through a resistor 118, a choke-coil 119, and a make-contact 120 of the braking-relay Bkg, to the negative bus G— of the direct-current generator DC—GEN.

It should be understood that the automatic operation-controlling mechanism has a number of presetting adjustments. The three alternating-current timers TD—Acc, TD—Rev, and TD—Bkg are provided with the usual timer-adjustments, whereby the desired timing-intervals may be preselected, in a manner which will be subsequently described.

In addition, there is a distance-preselecting drum 121, which is shown above the polyphase motor M, in the diagram. This drum has many positions, corresponding to the various current-transformers CT—8, CT—10, and so on, all the way down the track, as far as the last track-point at which the acceleration-run of the polyphase-motored moving device M may be permitted to continue, the remaining portion of the track being necessary for stopping the moving device M. In the schematic representation of the distance-preselecting drum 121 only the first four positions are illustrated, by way of example, with the understanding that there will be as many additional positions as may be required. The first four drum-positions are indicated by the numerals 8, 10, 12 and 14, corresponding to the correspondingly numbered current-transformers CT.

The position-preselecting drum 121 has wiring-connections such that each drum-position, in general, connects the correspondingly numbered current-transformer CT to the actuating coil Trk—1 of one of the track-relays, and connects the next current-transformer CT to the actuating coil Trk—2 of the other track-relay, or vice versa, while short-circuiting all of the other current-transformers CT. The current-transformer CT which first energizes one of the track-relays Trk—1 or Trk—2 thus serves to terminate the accelerating-run of the polyphase-motored device M, by actuating one of the track-relays Trk—1 or Trk—2, and thus interrupting the energizing-circuit of the forward-contactor F, at the back-contact 44 or 45, as the case may be. The other track-relay Trk—2 or Trk—1, which becomes energized by the next succeeding current-transformer CT, thus serves as a sort of backup-protection, to make sure that the forward-run is terminated, even though one of the track-relays should fail.

The operation of my invention will best be understood by considering an airship-launching operation, or series of operations, in accordance with the principal intended use or application for which the invention was designed. First, the engineer or operator in the power-plant must start up the flywheel-set, by starting the prime-mover PM, with a weak field on the direct-current generator DC—GEN, properly controlling the fields 26 and 25 until the flywheel-set is brought up to the desired speed of 1300 R. P. M., or such other speed as may be desired. This operation may take a number of minutes, and it stores up sufficient energy in the flywheel FW, so that the intermittent-service rating of the polyphase generator AC—GEN may be a number of times larger than the continuous ratings of the two direct-current machines. After the flywheel-set has been accelerated to a sufficiently high intermediatee speed, the direct-current regulation is thereafter such as to maintain a substantially constant voltage on the direct-current generator-terminals G+ and G—.

The power-plant engineer or operator next needs certain data on the plane to be launched, including the weight of the plane, the required launching-speed, and the average effective self-propelling thrust of the plane itself, during the starting-run (after making allowance for wind-conditions). In accordance with previously prepared charts or calibration-curves, the power-plant operator then sets the run-selecting drum 121 at the position marked on the chart or calibration-curve, thus preselecting the number of feet during which the polyphase-motored shuttle-car M may be energized. As a safety precaution, the timing of the acceleration-timer TD—Acc is adjusted, in accordance with another chart or calibration-curve, so as to cut off the accelerating energization of the shuttle-car M shortly after there has been sufficient time for the car to accelerate the plane to slightly above its required launching-speed.

The power-plant operator must also preselect the time during which the direct-current braking-power is applied to two or more phases of the shuttle-car M, and, if reverse-power plugging is also utilized, as shown in the illustrated embodiment of my invention, the setting of the time of application of the reverse-sequence power must also be preselected. In some applications of my invention, the reverse-power operation may be omitted, and the field-relay Fld may be deenergized, and the braking-relay Bkg may be energized, as soon as the track-switch Trk—1 interrupts the energization of the forward-contactor F, at 44, for example. However, in some applications, direct-current braking may not be relied upon as the sole means for bringing the shuttle-car M to a stop, without overrunning the available track-length, and without bringing too great a mechanical stress on the car or the track, due to the magnetic attraction caused by the direct-current energization of the motor-windings of the car. It will be assumed, for the purposes of illustration, therefore, that reverse-power energization of the shuttle-car M is utilized.

Again using his previously prepared charts or calibration-curves, the power-plant operator then selects the proper time-setting for the reverse-power timer TD—Rev. This reverse power timing may be advantageously chosen so that it almost but not quite, brings the towing-car M to a stop, if the acceleration-run terminates sufficiently prior to the midpoint of the track, or prior to any other preselected point along the track, so that the car will be left coasting, with a relatively small forward velocity, away from the starting point, at the instant of opening of the reverse-phase-sequence main-contactors R. If the acceleration-run extends beyond this preselected point, it may be desirable to choose the reverse-power timing so that the direction of movement of the shuttle-car M is actually reversed, and so that the car is left coasting backwards, at a slow velocity, back toward the starting-point, at the instant of opening of the reverse-contactors R.

The power-plant operator may then set his braking-timer TD—Bkg, so as to shut off the direct-current braking-power a short while after his charts or calibration-curves show that the car will have had ample time to be brought to a dead standstill, shutting off this braking-power so that there will be no unnecessary power-drainage from the direct-current generator DC—GEN, and no undue heating of the motor-windings of the shuttle-car M. The release of the braking-power drain from the direct-current generator DC—GEN makes that much more power available for the direct-current generator to supply to the direct-current motor for reaccelerating the flywheel-set after the polyphase contactors F and R are both open.

The power-plant operator is now ready to launch the plane. When the proper clearances have been given, he then depresses the launching-pushbutton L—PP in the fourth line of the schematic diagram, thus energizing the launching-relay L, which immediately seals itself in its actuated position, through a holding-circuit including its make-contact 41, and the back-contact 43 of the No. 3 time-delay relay TD3. The back-contact TD3 is not opened until the braking-timer TD—Bkg has completed its preset time-run after having been energized, at 31, at the beginning of the braking-operation.

As soon as the launching-relay L is actuated, its make-contact 41 immediately energizes the forward-contactor F, through the circuits 47 and 49, and as soon as the forward-contactor F is closed its make-contact 51 energizes the field-relay Fld and the No. 3 field-resistance relay Fld—R3, through the circuits 53 and 34. The field-relay and the field-resistance relay seal themselves in, through a holding circuit 56—57—58—59—53—54—34. These operations cause the forward-contactor F to connect the polyphase generator AC—GEN to the motored self-propelled shuttle-car M, in the forward phase-sequence, and then cause the voltage of the direct-current generator DC—GEN to be applied to the field-winding 104 of the alternating-current generator, through that portion of the field-resistance 105 which is not short-circuited by the make-contact 113 of the No. 3 field-resistance relay Fld—R3. The time-constant of the alternating-current generator causes a certain inherent time-delay in the building up of the generator-field, so that the generator-voltage is built up and applied gradually, but yet quickly, to the shuttle-car, thus avoiding undue shock or acceleration. The shuttle-car then accelerates rapidly, pulling the plane (not shown) which is being launched.

When the shuttle-car M reaches its preset length of accelerating-run, the power which is being fed into the track TRK energizes the current-transformer CT at that point in the track, and thus energizes one of the track-relays Trk—1 or Trk—2, through the adjustment of the distance-selector drum 121. The track-relay thus picks up and opens the forward-contactor circuit F at 44 or 45.

The actuation of the track-relay also closes the make-contact 61 or 62, thus energizing the circuit 58—64. When the forward-contactor F is fully deenergized, opening the polyphase connection between the alternating-current generator and the shuttle-car, the back contact 66 of this forward contactor F completes a circuit from 64 to 67, and energizes the reverse-contactor R and the No. 4 field-resistance relay Fld—R4. This applies reverse-power polyphase energy to the shuttle-car M, thus very strongly decelerating the car and causing the plane to pull ahead of the car, automatically unhooking itself from the car and taking off from the field.

While I have shown a forward-contactor interlock 66 in the energizing-circuit of the reverse-contactor R, in the illustrative embodiment of my invention, it should be understood that this detail, as well as many other details of the exemplary circuits, could be omitted. If the back-contact 66 of the forward-contactor F were omitted, or if this back-contact 66 should close at the very beginning of the opening-stroke of the forward-contactor F, the actuating-coil of the reverse-control R would be energized by 61, 62 or 63, at substantially the same time that the actuating-coil of the forward-contactor F would be deenergized by 44, 45 or 46, and the reverse-contactor R would close its main contacts 23 before the forward-contactor F could open its main contacts 22 far enough to break the arc and interrupt the application of forward-phase-sequence polyphase power to the polyphase shuttle-car bus B1, B2 and B3. This would interpose a momentary three-phase short-circuit on both the shuttle-car motor M and the polyphase generator AC—GEN, until the forward-contactor F could interrupt the arcs at its main contacts 22. The short-circuiting of the motor M would terminate the forward-acceleration power-application, and it would simultaneously initiate a braking-operation, caused by the flux which was trapped in the motor at the instant of short-circuit. The momentary short-circuit on the power-plant generator AC—GEN would impose an additional current-drainage on the generator and an additional current-interrupting duty on the main contacts 22 of the forward-contactor F, but these additional burdens could easily be withstood, because, in any event, the generator AC—GEN has to operate, during the reverse-power operation, close to a short-circuited condition.

When the forward-contactor interlock 66 is used, as shown, and adjusted so as to close the energizing-circuit of the reverse-contactor R only after the forward-contactor F is fully open, there is inevitably a split-second time-interval, after the termination of the forward-power run, before the application of reverse-power braking to the shuttle-car, and during this time-interval the shuttle-car will be freely coasting, at full speed, along the trackway. At high speeds, this may amount to fifty or a hundred feet of track, more or less, which is wasted, requiring just that much greater length of track in order to provide enough track in which to be able to bring the shuttle-car to a stop.

With the discontinuance of the forward-power operation, the launching-operation is completed, so far as the plane is concerned, but the shuttle-car will be running at anywhere from 75 to 225 miles per hour, and it must be safely controlled, and the control must be automatic, because the speed will usually be too great, and the distance of the car from available observation-points will usually be too great, to safely rely upon expert manual control.

The closure of the No. 4 field-resistance relay Fld—R4 cuts out practically all of the field-resistance 105, thus still further increasing the excitation of the polyphase generator, in order to provide the maximum available plug-reversal power to the polyphase motor M of the shuttle-car.

When the reverse-contactor R is first energized, it picks up its make-contact 30 and energizes the reverse-power timer TD—Rev; and at the end of the preset time of this timer, it closes its contact 96 in the circuit 95, and energizes the No. 2 time-delay relay TD2. It will be noted that this circuit 95 is energized, because at least one of the track-relays Trk—1 or Trk—2 has responded, closing its make-contact 92 or 93, as the case may be, and these track-relays are position-retaining relays, which retain their actuated positions, until the resetting coils are energized.

When the No. 2 time-delay relay TD2 picks up, it opens its back-contact 56 in the circuit 62—58, thereby deenergizing both the reverse-contactor R and the field-switch Fld, thus not only disconnecting all polyphase power from the car but also deenergizing the field-winding 104 of the alternating-current generator, restoring the generator to its original unexcited condition. The disconnection of the polyphase-generator field-winding 104 from the direct-current generator DC—GEN also has the effect of relieving said direct-current generator of the additional load which is placed upon it when it is called upon to excite the large alternating-current generator AC—GEN, thus making more power available for the direct-current generator to supply to the motor DC—MOT of the flywheel motor-generator set.

The actuation of the No. 2 time-delay relay TD2 closes its make-contact 69, in the circuit 36—69—70, so that, as soon as the reverse-contactor R is fully returned to its non-actuated condition, with the polyphase power-contacts all open, its back-contact 70 closes, and energizes the braking-relay B*kg* which closes its contacts 117 and 120, thus immediately again utilizing the energy of the direct-current generator DC—GEN to feed direct-current braking-power into a plurality of conductors of the polyphase motor-terminals B1, B2 and B3. Any number or all of the phases of the polyphase motor M can thus be supplied with direct-current energy. In the illustrated example, power is fed into the motor-terminal bus B1, and out of the bus B3. The choke-coil 119 limits the rate of rise of the direct current, upon the application of the direct-current braking-power, and thus protects the direct-current generator DC—GEN from undue stresses. The resistor 118 limits the magnitude of the direct-current braking-power to the desired value.

The application of a direct-current field to the primary windings of the polyphase motor M, at a time when the primary windings of the motor are moving along the track, with the shuttle-car velocity other than zero, causes the direct-current field, which moves with the car, to cut the squirrel-cage secondary windings (not shown) which are disposed along the track, as shown in the Powers patent. This causes a flux-cutting in the secondary windings of the linear motor M, thus bringing the motor to a standstill.

When the breaking-relay B*kg* is first energized, it picks up its make-contact 31 and energizes the braking-timer TD—B*kg*; and the latter, at the end of its preset time, picks up its contact 98 in the circuit 95, and energizes the No. 3 time-delay relay TD3, which opens its back-contact 43, in the circuit 42—43—36, and finally deenergizes the launching-relay L, which has been maintaining the automatic sequence of operations throughout all this time, usually amounting to considerably less than a minute.

The launching-relay L is utilized, in accordance with my invention, to prevent the utilization of the spotting-switch SS, by keeping open the launching-relay back-contact 71, as long as the launching-relay is in its actuated condition. The reason for this, is that the amount of polyphase power which is under the control of the operator, through the spotting-switch SS, is insufficient to make it safe to allow the operator to utilize this spotting-switch to interfere with the automatic launching-operation, once the launching has been started, even in the face of a grave emergency. For the purpose of taking care of such emergencies, another emergency-switch (not shown) is provided, which puts the full power of the power-plant under the control of the operator under emergency-conditions, and enables the operator to take the control of the shuttle-car away from the automatic launching-mechanism which is controlled by the launching-relay L.

When the shuttle-car M has been brought to a full stop, and the launching-relay holding-circuit has been interrupted at 43, the operator, at the deck-stand or deck-stands which is or are provided with a spotting-switch SS, may then actuate his spotting-switch to feed a small amount of polyphase power to the shuttle-car, in either the forward or reverse phase-sequence, to bring the car back to its starting-point, and to "spot" it within a couple of inches of the desired point, for the next takeoff or launching.

Before the next launching-operation, the reset-coils of the three retained-position relays T*rk*—1, T*rk*—2 and TDR must be energized, to restore these relays to their original non-actuated condition. This operation is accomplished by means of the reset-pushbutton Reset—DS1 or Reset—DS2 in the circuit 88. When the retained-position relays are reset, the circuit 95 is interrupted, and the No. 2 and No. 3 time-delay relays TD2 and TD3 are deenergized, thus reclosing their back-contacts 56 and 43 in the holding-circuits of the field-contactor F and the launching-relay L, respectively.

The track-heating pushbutton H*tg*—DS1 is utilized at times when it is desirable to feed polyphase energy into the track TRK and into the feeder-buses B1, B2 and B3, either for the purpose of melting snow or ice from the track, or for drying out the insulators of the polyphase feeder and third-rail system. When this operation is to be performed, it is necessary to manually place suitable short-circuiting jumpers (not shown) across the track TRK and the third-rail buses B2 and B3, at an end of the track, and it is usually desirable to place other jumpers (not shown) around the main contacts of one of the polyphase contactors F or R for the purpose of feeding polyphase power into the track-system without overburdening the main contacts of the polyphase contactors. When these jumpers have been arranged in position, as just described, the heating-pushbutton H*tg*—DS1 is depressed, and left down as long as it is desired for the track-heating to continue. This closes the No. 1 field-resistance relay F*ld*—R1, which immediately actuates the field-contactor F*ld*, thus energizing the polyphase-generator field-winding 104, with a weak energization, through practically all of the field-resistance 105. When the track-heating function is finished, the operator must reopen the heating-pushbutton.

The heating-pushbutton, without the jumpers (not shown) for connecting the polyphase generator-terminals T1, T2 and T3 to the track-system, is also useful during the shutting down of the flywheel motor-generator set, because the closure of the heating-pushbutton H*tg*—DS1 connects the polyphase-generator field-winding circuit 102—103—104—105 across the terminals of the direct-current motor DC—MOT, which operates as a generator when the prime-mover PM is deenergized, thus imposing an additional load on the regenerating direct-current motor DC—MOT, and materially reducing the time which it takes for the flywheel-set to be brought to standstill, and thus reducing the length of time which is necessary for the station-personnel to be kept on duty, for the purpose of watching the various bearings and other features which have to be watched while the apparatus is in motion.

Certain control-circuit features of the illustrated apparatus are more particularly described and claimed in an application of Ruel C. Jones, Serial No. 741,914, filed April 16, 1947; and certain features relating to the power-plant are more particularly described and claimed in an application of E. C. Whitney, Serial No. 730,322, filed February 24, 1947, both assigned to the Westinghouse Electric Corporation.

While I have illustrated my invention in a single form of embodiment, I wish it to be understood that the illustration is intended only as a suggestion of the essential features of a preferred form of embodiment, as the invention is obviously susceptible of embodiment in other forms, with variations such as would suggest themselves to the skilled worker in the art. I desire, therefore,

I claim as my invention:

1. In combination, a polyphase generator having a field-winding, a direct-current energy-circuit supply-line, field switching-means for connecting and disconnecting said field-winding to and from said direct-current supply-line, a polyphase load-circuit supply-line, forward and reverse phase-sequence polyphase switching-means for connecting and disconnecting said polyphase load-circuit supply-line to and from said polyphase generator, braking switching-means for connecting and disconnecting a plurality of terminals of said polyphase load-circuit supply-line to and from said direct-current supply-line, operation-starting means, operable at a time when the braking switching-means are open, for closing said polyphase switching-means in a desired forward phase-sequence and for also closing said field switching-means, polyphase-deenergization means for opening said polyphase switching-means so as to disconnect said load-circuit supply-line from the polyphase generator and for also opening said field switching-means so as to deenergize the field-winding of the polyphase generator, and braking-controlling means, responsive to an operation of said polyphase-deenergization means, for closing said braking switching-means.

2. In combination, a polyphase generator having a field-winding, a direct-current energy-circuit supply-line, field switching-means for connecting and disconnecting said field-winding to and from said direct-current supply-line, a polyphase motor, forward and reverse phase-sequence polyphase switching-means for connecting and disconnecting said polyphase motor to and from said polyphase supply-line, braking switching-means for connecting and disconnecting a plurality of terminals of said polyphase motor to and from said direct-current supply-line, and control-means comprising run-initiating means, operable only at a time when the braking switching-means are open, for operating said polyphase switching-means in the one phase-sequence or the other for initiating a forward acceleration-run of the polyphase motor, said run commencing at a time when the field switching-means are closed, means for opening said polyphase switching-means, means for opening said field switching-means, braking control-means, operable only at a time when the polyphase switching-means and the field switching-means are both open, for operating said braking switching-means, and means for opening said braking switching-means.

3. In combination, a relatively constant-speed prime-mover, a direct-current generator driven by said prime-mover, a direct-current motor constantly connected to said direct-current generator, a polyphase generator driven by said direct-current motor, said polyphase generator having a large flywheel-effect and having a field-winding, field switching-means for connecting and disconnecting said field-winding to and from said direct-current generator, a polyphase motor, forward and reverse phase-sequence polyphase switching-means for connecting and disconnecting said polyphase motor to and from said polyphase generator, braking switching-means for connecting and disconnecting a plurality of terminals of said polyphase motor to and from said direct-current generator, and control-means comprising run-initiating means, operable only at a time when the braking switching-means are open, for operating said polyphase switching-means in the one phase-sequence or the other for initiating a forward acceleration-run of the polyphase motor, said run commencing at a time when the field switching-means are closed, means for opening said polyphase switching-means, means for opening said field switching-means, braking control-means, operable only at a time when the polyphase switching-means and the field switching-means are both open, for operating said braking switching-means, and means for opening said braking switching-means.

4. In combination, a polyphase load-circuit supply-line, a polyphase energy-circuit supply-line, a direct-current energy-circuit supply-line, a polyphase motor constantly connected to said polyphase load-circuit supply-line, alternating-current-controlling means operable only when said direct-current energy-circuit supply-line is disconnected and comprising a main starting-contactor for energizing said polyphase load-circuit supply-line from said polyphase energy-circuit supply-line in the one phase-sequence or the other for a forward run of said polyphase motor, means for opening said main starting-contactor for terminating said forward run, direct-current-controlling means operable only when said polyphase energy-circuit supply-line is disconnected and comprising a braking-contactor for energizing a plurality of conductors of said polyphase load-circuit supply-line from said direct-current energy-circuit supply-line for braking said polyphase motor, means for opening said braking-contactor for terminating the direct-current braking, and timing-means, activated by the commencement of the braking-operation, for opening the braking switching-means.

5. The invention as defined in claim 1, characterized by the means for opening the braking-contactor comprising a timing-means activated by the commencement of the direct-current braking-operation.

6. The invention as defined in claim 2, characterized by the means for opening the braking switching-means comprising a timing-means activated by the commencement of the direct-current braking-operation.

7. The invention as defined in claim 3, characterized by the means for opening the braking switching-means comprising a timing-means activated by the commencement of the direct current braking-operation.

8. In combination, a polyphase generator having a field-winding, a direct-current energy-circuit supply-line, field switching-means for connecting and disconnecting said field-winding to and from said direct-current supply-line, a polyphase load-circuit supply-line, forward and reverse phase-sequence polyphase switching-means for connecting and disconnecting said polyphase load-circuit supply-line to and from said polyphase generator, operation-presetting means for presetting the termination of the forward-phase-sequence energization of the polyphase load-circuit supply-line, operation-starting means for closing said polyphase switching-means in a desired forward phase-sequence and for also closing said field switch-means, means responsive to the operation presetting means for opening the polyphase switching-means in the forward phase-sequence and promptly thereafter closing the polyphase switching-means in the reverse phase-sequence without opening the field switching-means, reverse-power presetting-means for presetting the reverse-power operation, and means responsive to the reverse-power presetting-means for opening the polyphase switching-means and the field switching-means.

9. In combination, a polyphase energy-circuit supply-line, a direct-current energy-circuit supply-line, a polyphase load-circuit supply-line, forward and reverse phase-sequence polyphase switching-means for connecting and disconnecting said polyphase load-circuit supply-line to and from said polyphase energy-circuit supply-line, braking switching-means for connecting and disconnecting a plurality of terminals of said polyphase load-circuit supply-line to and from said direct-current supply-line, operation-presetting means for presetting the termination of the forward-phase-sequence energization of the polyphase load-circuit supply-line, operation-starting means, operable at a time when the braking switching-means are open, for closing said polyphase switching-means in a desired forward phase-sequence, means responsive to the operation-presetting means for opening the polyphase switching-means in the forward phase-sequence and closing the polyphase switching-means in the reverse phase-sequence, reverse-power presetting-means for presetting the reverse-power operation, and means responsive to the reverse-power presetting-means for opening the polyphase switching-means and promptly thereafter closing the braking switching-means.

10. In combination, a polyphase generator having a field-winding, a direct-current energy-circuit supply-line, field switching-means for connecting and disconnecting said field-winding to and from said direct-current supply-line, a polyphase load-circuit supply-line, forward and reverse phase-sequence polyphase switching-means for connecting and disconnecting said polyphase load-circuit supply-line to and from said polyphase generator, braking switching-means for connecting and disconnecting a plurality of terminals of said polyphase load-circuit supply-line to and from said direct-current supply-line, operation-presetting means for presetting the termination of the forward-phase-sequence energization of the polyphase load-circuit supply-line, operation-starting means, operable at a time when the braking switching-means are open, for closing said polyphase switching-means in a desired forward phase-sequence and for also closing said field switching-means, means responsive to the operation-presetting means for opening the polyphase switching-means in the forward phase-sequence and closing the polyphase switching-means in the reverse phase-sequence without opening the field switching-means, reverse-power presetting-means for presetting the reverse-power operation, and means responsive to the reverse-power presetting-means for opening the polyphase switching-means and the field switching-means and promptly thereafter closing the braking switching-means.

11. In combination, a polyphase load-circuit supply-line, a polyphase energy-circuit supply-line, a direct-current energy-circuit supply-line, a polyphase motor constantly connected to said polyphase load-circuit supply-line, forward and reverse main contactor-means for energizing said polyphase load-circuit supply-line from said polyphase energy-circuit supply-line in the one phase-sequence or the other, a braking-contactor-means for energizing a plurality of conductors of said polyphase load-circuit supply-line from said direct-current energy-circuit supply-line, run-presetting means for presetting the termination of the forward run of the motor, means for closing the forward contactor-means for initiating the forward run of the motor, means responsive to the run-presetting means for opening the forward contactor-means and closing the reverse contactor-means, reverse-power presetting-means for presetting the reverse-power operation, and means responsive to the reverse-power presetting-means for opening the reverse contactor-means and promptly thereafter closing the braking-contactor-means.

12. In combination, a polyphase generator having a field-winding, a direct-current energy-circuit supply-line, field switching-means for connecting and disconnecting said field-winding to and from said direct-current supply-line, a polyphase motor, forward and reverse phase-sequence polyphase switching-means for connecting and disconnecting said polyphase motor to and from said polyphase supply-line, braking switching-means for connecting and disconnecting a plurality of terminals of said polyphase motor to and from said direct-current supply-line, and control-means comprising run-initiating means, operable only at a time when the braking switching-means are open, for operating said polyphase switching-means in the one phase-sequence or the other for initiating a forward acceleration-run of the polyphase motor, said run commencing at a time when the field switching-means are closed, means for opening said polyphase switching-means, means for opening said field switching-means, braking control-means, operable only at a time when the polyphase switching-means and the field switching-means are both open, for operating said braking switching-means, and means for opening said braking switching-means.

13. In combination, a relatively constant-speed prime-mover, a direct-current generator driven by said prime-mover, a direct-current motor constantly connected to said direct-current generator, a polyphase generator driven by said direct-current motor, said polyphase generator having a large flywheel-effect and having a field-winding, field switching-means for connecting and disconnecting said field-winding to and from said direct-current generator, a polyphase motor, forward and reverse phase-sequence polyphase switching-means for connecting and disconnecting said polyphase motor to and from said polyphase generator, braking switching-means for connecting and disconnecting a plurality of terminals of said polyphase motor to and from said direct-current generator, run-presetting means for presetting the termination of the forward run of the polyphase motor, run-initiating means for operating said polyphase switching-means in the forward phase-sequence for initiating a forward acceleration-run of the polyphase motor, said run commencing at a time when the field switching-means are closed and the braking switching-means are open, means responsive to the run-presetting means for opening the polyphase switching-means in the forward phase-sequence and promptly thereafter operating the polyphase switching-means in the reverse phase-sequence, reverse-power presetting-means for presetting the reverse-power operation, and means responsive to the reverse-power presetting-means for opening the polyphase switching-means in the reverse phase-sequence and opening the field-switching means and closing the braking switching-means.

14. The invention as defined in claim 9, in combination with a timing-means, activated by commencement of the braking-operation, for opening the braking switching-means.

15. The invention as defined in claim 10, in combination with a timing-means, activated by the commencement of the direct-current braking-operation, for opening the braking-contactor-means.

16. The invention as defined in claim 11, in combination with a timing-means, activated by the commencement of the direct-current braking-operation, for opening the braking switching-means.

17. The invention as defined in claim 12, in combination with a timing-means, activated by the commencement of the direct-current braking-operation, for opening the braking switching-means.

18. The invention as defined in claim 13, in combination with a timing-means, activated by the commencement of the direct-current braking-operation, for opening the braking switching-means.

MAURICE F. JONES.

REFERENCES CITED

The following references are of record in the file of this patent:

UNITED STATES PATENTS

| Number | Name | Date |
|---|---|---|
| 1,273,782 | Hobart | July 23, 1918 |
| 2,265,933 | Adams | Dec. 9, 1941 |
| 2,279,228 | Evans et al. | Apr. 7, 1942 |